United States Patent
Tomescu et al.

(10) Patent No.: US 10,279,316 B2
(45) Date of Patent: May 7, 2019

(54) CLOSED LOOP MEMBRANE FILTRATION SYSTEM AND FILTRATION DEVICE

(71) Applicant: THETIS ENVIRONMENTAL INC., Hamilton (CA)

(72) Inventors: Ionel John Tomescu, Ancaster (CA); Alice Monica Tomescu, Ancaster (CA)

(73) Assignee: Thetis Environmental Inc., Hamilton (CA)

( * ) Notice: Subject to any disclaimer, the term of this patent is extended or adjusted under 35 U.S.C. 154(b) by 255 days.

(21) Appl. No.: 15/309,101

(22) PCT Filed: May 8, 2015

(86) PCT No.: PCT/CA2015/050412
§ 371 (c)(1),
(2) Date: Nov. 4, 2016

(87) PCT Pub. No.: WO2015/168801
PCT Pub. Date: Nov. 12, 2015

(65) Prior Publication Data
US 2017/0080390 A1   Mar. 23, 2017

Related U.S. Application Data

(60) Provisional application No. 62/072,741, filed on Oct. 30, 2014, provisional application No. 61/990,366, filed on May 8, 2014.

(51) Int. Cl.
*B01D 61/22* (2006.01)
*B01D 61/20* (2006.01)
(Continued)

(52) U.S. Cl.
CPC .......... *B01D 61/22* (2013.01); *B01D 61/145* (2013.01); *B01D 61/147* (2013.01); *B01D 61/20* (2013.01);
(Continued)

(58) Field of Classification Search
None
See application file for complete search history.

(56) References Cited

U.S. PATENT DOCUMENTS

| 4,761,229 A | 8/1988 | Thompson et al. |
| 5,002,667 A | 3/1991 | Kutowy et al. |

(Continued)

FOREIGN PATENT DOCUMENTS

| WO | 9722394 A1 | 6/1997 |
| WO | 9955448 A1 | 11/1999 |

(Continued)

OTHER PUBLICATIONS

International Patent Application No. PCT/CA2015/050412, International Search Report and Written Opinion dated Oct. 5, 2015.
(Continued)

*Primary Examiner* — Chester T Barry

(57) ABSTRACT

In a membrane filtration system and process, retentate exiting a filtration element is maintained inside a loop and redirected back to the inlet of a pump. The pump may produce a generally constant velocity in the loop. Water is concentrated inside the loop until discharged in batches. Feed water enters the loop automatically. The flux through the filtration element is maintained by a controlled valve or pump in communication with a permeate outlet. A filtration element has one or more rigid inserts in a housing. The inserts are covered with membranes. The element is configured to provide open feed channels beside the inserts. The membranes and inserts are potted at an edge, which may be their only attachment to the housing. Permeate flows between the membrane and the insert to the potted edge. The filtration element may be used in the system and process described herein or in others.

19 Claims, 12 Drawing Sheets

Basic P&ID for single train, closed loop filtration

(51) Int. Cl.
 C02F 1/44 (2006.01)
 C02F 3/28 (2006.01)
 B01D 61/14 (2006.01)
 B01D 63/08 (2006.01)
 C02F 1/00 (2006.01)
 C02F 3/12 (2006.01)
(52) U.S. Cl.
 CPC ............ *B01D 63/08* (2013.01); *C02F 1/008* (2013.01); *C02F 1/444* (2013.01); *C02F 3/2853* (2013.01); *B01D 2311/08* (2013.01); *B01D 2311/25* (2013.01); *B01D 2313/243* (2013.01); *B01D 2315/14* (2013.01); *C02F 3/1268* (2013.01); *C02F 2209/005* (2013.01); *C02F 2209/40* (2013.01); *C02F 2301/046* (2013.01); *Y02W 10/15* (2015.05)

(56) References Cited

U.S. PATENT DOCUMENTS

| | | | |
|---|---|---|---|
| 5,264,171 A | 11/1993 | Prasad et al. | |
| 5,395,514 A * | 3/1995 | Siegler | B01D 61/142 184/6.24 |
| 5,626,752 A | 5/1997 | Mohn et al. | |
| 2006/0011544 A1 * | 1/2006 | Sharma | B01D 61/002 210/640 |
| 2006/0201876 A1 * | 9/2006 | Jordan | B01D 61/14 210/609 |
| 2007/0125642 A1 | 6/2007 | Perry | |
| 2009/0217777 A1 * | 9/2009 | Hanson | B01D 61/145 73/863.23 |
| 2011/0253624 A1 | 10/2011 | Ewing | |
| 2013/0059345 A1 * | 3/2013 | Kurihara | C12P 19/14 435/99 |
| 2013/0248450 A1 | 9/2013 | Kenley et al. | |

FOREIGN PATENT DOCUMENTS

| | | |
|---|---|---|
| WO | 0110540 A2 | 2/2001 |
| WO | 2005107929 A2 | 11/2005 |
| WO | 2007045015 A1 | 4/2007 |
| WO | 2011075748 A1 | 6/2011 |
| WO | 2011149988 A1 | 12/2011 |
| WO | 2012065036 A1 | 5/2012 |
| WO | 2015153885 A1 | 10/2015 |

OTHER PUBLICATIONS

International Patent Application No. PCT/CA2016/051235, International Search Report and Written Opinion dated Jan. 10, 2017.
"Membranes the World Can Rely On", Berghof Membrane Technology—Company Presentation, 2013, www.bergof.com, 53 Pages.

* cited by examiner

Basic P&ID for single train, closed loop filtration

Multiple trains configuration/Closed loop system

CLOSED LOOP MEMBRANE FILTRATION SYSTEM AND FILTRATION DEVICE

RELATED APPLICATIONS

This application is a National Stage Entry of International Application No. PCT/CA2015/050412, filed May 8, 2015, which claims the benefit of U.S. provisional application No. 61/990,366 filed on May 8, 2014 and U.S. provisional application No. 62/072,741, filed on Oct. 30, 2014.

FIELD

This application relates to membrane filtration systems and devices.

BACKGROUND

Flat sheet membranes are made by casting a dope onto a substrate. The substrate may be, for example, a woven or non-woven fabric. The dope is cured into a solid membrane after casting. The curing mechanism may be, for example, interfacial polymerization or non-solvent induced phase separation. The resulting flat sheet membrane may have pores in a range from reverse osmosis to microfiltration. In one example described in U.S. Pat. No. 5,626,752, membrane filter elements are stacked atop one another to form a stack. The stacked units are sequentially arranged in a housing. A flow medium flows in sequence through the stacked units. Each of the membrane filter elements in the stack has a stabilizing element positioned between outer membrane elements.

US 2011/0253624, entitled Anaerobic Digester-Membrane Bioreactor for Treating a Waste Stream, describes an anaerobic reactor coupled with a membrane separation unit. Mixed liquor is pumped from an intermediate portion of the reactor, where the concentration of solids is relatively low, to the membrane separation unit. The mixed liquor is separated by the membrane unit into a permeate stream and a retentate stream. The retentate stream is pumped back to the anaerobic reactor and mixed with the mixed liquor in the reactor. Mixed liquor and relatively heavy solids are pumped from the bottom of the anaerobic reactor to a hydrocyclone. A stream concentrated with heavier solids is sent from the hydrocyclone to a dewatering unit. A lighter solids stream is sent from the hydrocyclone back to the anaerobic reactor. The membrane separation unit uses cross flow tubular membrane modules. A membrane feed pump forces mixed liquor and a recycled portion of the retentate under pressure through the insides of the membranes.

INTRODUCTION TO THE INVENTION

This specification describes a filtration system and process that uses a membrane module as a filtration element. The filtration system may be used to separate solid-liquid mixtures or emulsions. The feed stream to be separated may be, for example, oily wastewater or produced water, industrial or municipal wastewater, or mixed liquor or sludge from a bioreactor. The membranes are preferably in the form of tubular or flat sheet membranes and suited for ultrafiltration or microfiltration.

This specification describes a cross flow membrane filtration process. The process operates with pressurized water on the feed side of the membranes, optionally combined with suction on the permeate side of the membranes. The process includes a concentration step in which a concentrated stream (retentate) exiting a filtration element is maintained inside a loop and redirected back to the inlet of a recirculation pump. Feed water is added to the loop to replace permeate withdrawn through the filtration element. The concentration of solids (optionally including liquid droplets) in the water in the loop increases during the concentration step. The process also includes a deconcentration step in which water, in particular retentate, is removed from the loop and replaced with feed water such that the concentration of the water in the loop decreases. The process repeats a cycle including the concentration and deconcentration steps. In the case of a membrane bioreactor, sludge is wasted from the loop, preferably in a concentrated form, rather than from a process tank of the bioreactor.

Optionally, the process includes one or more of the following additional features, a) the pump is operated so as to produce a generally constant flow rate in the loop during the concentration step, or a flow rate that varies with membrane resistance; b) a portion of the loop on the inlet side of the pump, i.e. between the filtration element and the pump inlet, is in fluid communication with a feed tank such that the flow of feed water is self-regulating during the concentration step, the deconcentration step or both, and feed water flows by gravity from the feed tank; c) the flux through the filtration unit is kept generally constant, for example by a controlled valve or permeate pump in communication with a permeate outlet; d) the timing of a deconcentration step is determined considering a parameter related to transmembrane pressure or concentration of water in the loop or both; e) the volume of water (retentate) removed during the deconcentration step is less than or similar to the volume of water inside the loop; f) the feed side pressure is less than 100 kPa, preferably less than 50 kPa; and, g) the feed side pressure is less than 25 kPa and suction is provided on the permeate side of the membranes.

This specification also describes a filtration system adapted to operate a process as described above. The system may have a single pump for feed and recirculation, or a single feed and recirculation pump set. One or more parts of the system may be automated. The system may have a permeate valve or pump, either of which may be linked to a controller. The system may have a gravity, suction or siphon connection between a feed tank and a recirculation loop, thereby avoiding a dedicated feed pump.

This specification also describes a filtration element, alternatively called a module or device, and a method of making it. The filtration element preferably includes an MF or UF membrane sealed inside of a housing. The device may be used for water filtration, including wastewater filtration, for example in the filtration system and process described above.

The filtration device uses a bundle of structural inserts on the permeate side of the membranes to define feed channels through the bundle. The inserts are structural in the sense that they provide support for the membranes and locate the membranes within the housing. Membranes are attached to one or more faces of the inserts thereby lining the feed channels. The inserts define part of a permeate side of the bundle. The inserts may include passages for taking permeate from the membranes to edges of the inserts, or permeate spacers may be placed between the membranes and the inserts, or both. Feed spacer material is not required to support the membranes and feed spacer material is preferably not provided. However, turbulence may be optionally provided in the feed channels by way of feed cross flow in a manner similar to tubular membranes. The inserts optionally have one or more edges that are wider than the remainder of the inserts. A feed channel is defined between the opposed edges of a pair of adjacent inserts. A plurality of inserts may be stacked together directly, for example with the edges of adjacent inserts in contact with each other or separated only by intervening membrane material, potting material or a spacer or gasket, these optional materials optionally being narrower than the feed channel.

DETAILED DESCRIPTION

Figure 1:
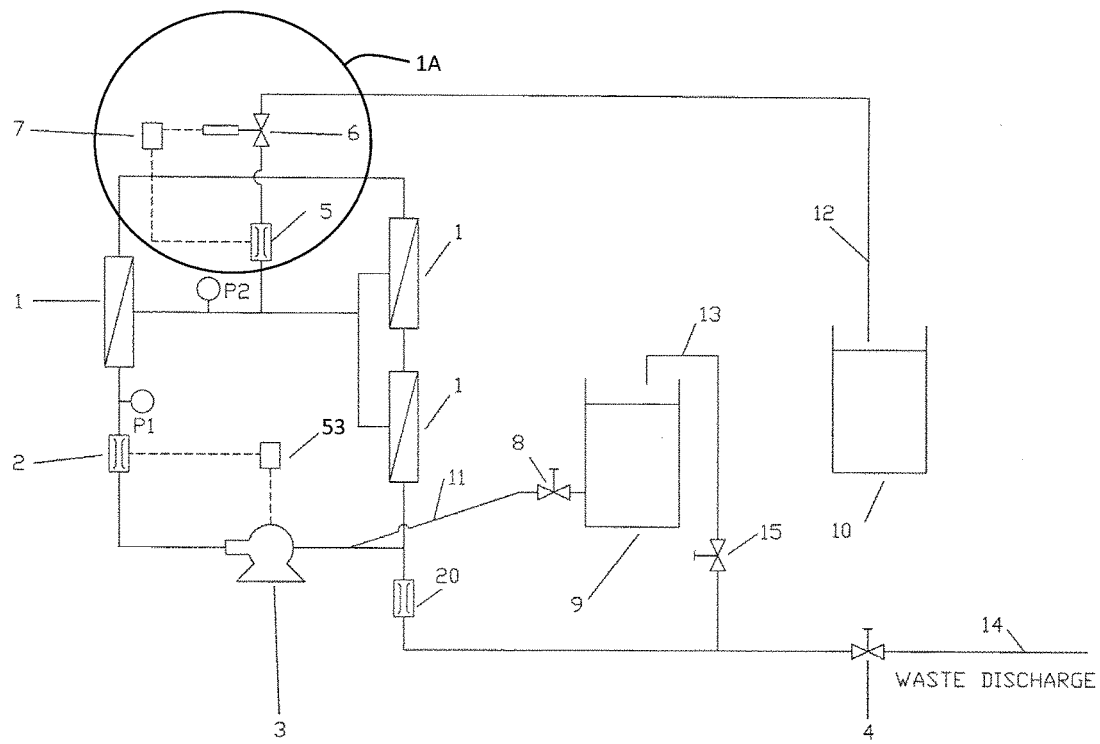
FIG. 1 is a schematic drawing of a system having a single loop with three modules connected in series.

A cross flow membrane filtration system and process may use hollow fiber, tubular, or flat sheet membranes. Membranes without feed channel spacers are preferred, particularly for applications in which the feed water to be filtered has a high concentration of solids, for example 1000 mg/L or more, or when it is desirable to produce a highly concentrated waste stream. Membranes without feed channel spacers include tubular membranes and, most preferably, the flat sheet membrane modules described herein. The word "solids" is used loosely in this patent and can include a separable liquid or gel phase. For example, the solid may be droplets of bitumen, oil or another organic compound. In another example, the solid may be particles of fat or grease. The systems and processes described herein are most suitable for microfiltration or ultrafiltration. The term "waste stream" is also used loosely to indicate a stream removed from the filtration system, optionally removed from a bioreactor through the filtration system, although the waste stream may be a valuable product that is processed further.

The system includes a pipe network (including pipes and ancillary valves, fittings etc.) defining a loop extending from the outlet of a crossflow or recirculation pump, through one or more filtration elements (alternatively called membrane modules) and returning to the inlet of the pump. The word "pump" may refer to a set of pumps arranged in series or parallel or both, optionally with one or more pumps kept on standby, that function together to force water to circulate in the loop. A tank or other supply of feed water to be treated is connected to the loop, typically between the last membrane module and the inlet of the crossflow pump. Feed water is preferably supplied to the loop by gravity or siphon, optionally assisted by suction created at the inlet of the recirculation pump or by the motion of water flowing in the loop, but may also be supplied by feed pump, or by a combination of these methods. Flow restriction in the loop or feed water pressure or both causes the membrane modules to be pressurized relative to atmospheric pressure when the crossflow pump is operating. Optionally, this pressure may be sufficient to create the desired transmembrane pressure across the membranes and permeate is produced by the crossflow pump alone or in combination with static head. Preferably, a permeate pump is connected to a permeate outlet of one or more membrane modules to provide, or increase, the flow of permeate. A permeate pump, if used, may be controlled as described herein for a permeate valve to provide a desired flux. Using the permeate pump helps avoid having excess velocity (relative to an efficient velocity for membrane scouring) in parts of the system as is sometimes required to provide sufficient transmembrane pressure without a permeate pump. The permeate pump may also reduce the amount of cake layer compaction relative to a system with a recirculation pump only by allowing a lower pressure to be maintained in the loop for a given transmembrane pressure.

The system may be configured to operate with feed pressure, feed velocity and transmembrane pressure similar to conventional cross flow tubular membrane systems. Alternatively, the system may operate at lower feed pressure and, optionally, lower transmembrane pressure. This can be achieved in part by having only a few, for example 6 or less, modules in series in the loop, or by design of the modules and or piping to reduce friction, or a combination of both methods. Feed pressure contributes to cake compression, which decreases flux. To avoid this, it is preferable to have a feed pressure less than 100 kPa or less than 50 kPa. Transmembrane pressure is preferably kept below a value which produces critical flux, which is in turn dependent on cross flow velocity of the feed water. In one system tested by the inventors with a filtration element as described further below, the feed water was oily machine shop wastewater, the feed velocity was about 3 m/s, the feed pressure was 10-30 kPa and the transmembrane pressure was increased beyond the feed pressure by using a permeate pump but without reaching critical flux.

The process cycles through a set of steps including a concentration step and a deconcentration step. During the concentration step, permeate is produced but only a small amount, preferably none, of the retentate leaves the loop. Feed water is added to the loop to preserve a generally constant volume of water in the loop, which includes the feed/retentate side volume of the membrane modules. In the case of a gravity feed of water from a tank to a part of the loop at lower pressure than the static head pressure of the tank, and possibly with other arrangements, the flow of feed water into the loop is essentially self-regulating. The concentration of solids in the loop increases over time during the concentration step.

During the deconcentration step, retentate is removed from the loop. This retentate is replaced, optionally in a self-regulating manner as described above, by a corresponding flow of feed water. The concentration of solids in the loop decreases over time during the deconcentration step. Preferably, the volume of retentate removed during the deconcentration step is smaller than, or similar to (i.e within 25% of), the volume of water in the loop. For example, a volume of retentate equal to between 25% and 125% of the loop volume, or between 50% and 100% of the loop volume, may be removed. Since the flow in the loop is essentially plug flow, and provided that the feed water inlet is located downstream of the retentate outlet, the deconcentration step results in the solids concentration in the loop decreasing. Optionally, the solids concentration in the loop may be reduced to near the concentration of the feed water when treating difficult feed water or operating under peak conditions, while with other feeds or at other times it may be preferable to discharge less, for example 75% or less, of the loop volume.

The process can also include a relaxation step. In the relaxation step, the permeate outlets of the membrane modules are closed to reduce or eliminate the transmembrane pressure. Water continues to flow around the loop and through the membrane modules. In the absence of a transmembrane pressure, foulants are removed from the membrane modules. The relaxation step preferably occurs before or during a deconcentration step. Optionally, the relaxation step can occur in part before and in part during the deconcentration step. Alternatively, the membranes may be backwashed rather than relaxed. Performing a relaxation or backwash step before or during a deconcentration allows at least some of the solids released from the membrane surface to be removed from the loop during the deconcentration step. Optionally, a volume of water that exceeds the volume of the loop can be discharged in the deconcentration step to allow the membranes to be flushed for a period of time with deconcentrated water while also removing solids released from the membrane surface from the loop.

During the concentration step, and optionally also during deconcentration and relaxation steps, the pump is preferably controlled to maintain a generally constant velocity in the loop. The velocity is constant over time but varies with position in the loop. Typically, a loop velocity is selected that provides flow at between about 1 and 5 m/s in each membrane module. The pump may be driven by a variable frequency drive (VFD) or other controllable means. A flow meter downstream of the pump is used to provide a signal to the pump controller, which modulates the pump to provide a loop flow rate at or near a selected flow rate, or to keep the loop flow rate within a selected range. The selected flow rate or range produces the desired velocity in the membranes in the loop.

Flux through the membranes is preferably also controlled with reference to a flow meter. This flow meter is located on the permeate side of the modules and provides a signal to a controller attached to a valve or permeate pump that is also on the permeate side of the modules. The controller modulates the position of the valve or speed of the permeate pump to provide a flux at or near a selected flux, or to keep the flux within a selected range. The filtration system can be started with the permeate valve opening simultaneously or with the permeate valve initially closed and opening over a period of 1 to 5 minutes, or a permeate pump initially turned off and spooling up simultaneously with the fed pump or over a period of 1 to 5 minutes, before allowing the permeate valve or pump to be controlled based on the permeate flow rate.

The timing of deconcentration or relaxation steps can be predetermined.

However, the timing is preferably based on a measured parameter. For example, monitoring pressure sensors upstream of a membrane module and on the permeate side of the module allows the TMP to be determined. When the TMP reaches a predetermined maximum, the membranes are relaxed. A relaxation step may occur between deconcentration steps. Alternatively, both a relaxation step and a deconcentration step can be performed when the maximum TMP is reached. In another alternative, the relaxation steps can be performed whenever a maximum TMP is reached and, optionally, also in combination with a deconcentration step that is performed at a time other than when a maximum TMP is reached. In another alternative, the timing of deconcentration steps can be determined considering another parameter related to concentration such as the work performed by the pump. This can be determined, for example, by monitoring the differential pressure near the inlet and outlet of the pump. In another alternative, when deconcentration and relaxation steps always occur generally together the concentration in the loop, pressure between the pump outlet and the membrane modules, and the TMP all increase roughly in proportion to each other. In that case, any one of those values, or a related parameter, can be used to control the timing of deconcentration and relaxation steps.

The filtration process may also include chemical cleaning steps. Preferably, maintenance cleaning with cleaning chemicals is provided periodically. Optionally, additional chemical cleaning steps may be triggered by one of the parameters described above, for example TMP, or by a compound parameter such as rate of change of TMP or TMP per unit of solids concentration of water in the loop.

Optionally, the flow rate can be increased during the concentration step. For example, the flow rate may be increased linearly over the duration of the concentration step or generally in proportion to the increase in solids concentration of water in the loop. In this case, the permeate valve will tend to close, or the permeate pump will run more slowly, as the concentration step continues to maintain the desired flux, or a constant flux. Solids concentration in the water in the loop, or the change in solids concentration in the loop, can still be estimated by the TMP or change in TMP. Alternatively, solids concentration in the loop can be estimated based on pressure differential between the inlet and outlet of the recirculation pump normalized for flow rate. The timing of deconcentration or relaxation steps or both can be determined considering TMP or solids concentration in the loop. When a permeate pump is used, the feed flow rate during the deconcentration may be increased, kept constant, or decreased over time.

When used to filter water without a biological process, wasting retentate only during deconcentration steps can produce a more concentrated waste stream than a feed and bleed process with a similar average solids concentration over time in the loop. When the filtration system is used in combination with a biological reactor, for example an anaerobic digester, or an aerobic treatment tank, or an activated sludge process, some retentate may be transferred from the loop during the concentration step to the reactor to increase the retention time of microorganisms. Optionally, this transfer, if any, may be provided by a continuous bleed of retentate to the reactor. However, transfer of retentate from the loop to the bioreactor is preferably provided by returning some of the waste streams produced during deconcetration steps to the reactor. Transferring waste streams produced during deconcetration steps tends to increase the solids concentration in the reactor. This can allow for a smaller reactor and thereby reduce the total size of the system. For example, waste activated sludge, wastewater or another feedstock may be provided to an anaerobic digester at about 2-5,000 mg/L. The digester may operate at 5-15,000 mg/L with a return of some of the retentate at 30,000 to 50,000 mg/L from the membrane filtration system to the digester. In another alternative, no retentate is returned to the digester or other bioreactor. Optionally, some or preferably all of the waste sludge to be withdrawn from the digester or other bioreactor may be withdrawn from the loop, as opposed to being wasted, for example, from the digester or other biological process tank directly. In this way, waste sludge is withdrawn in a concentrated form, for example 30,000 mg/L or more. This reduces the volume of waste sludge to be dried or disposed of without requiring separate sludge dewatering equipment.

An example of a filtration system is shown in FIG. 1. The main components of the system of FIG. 1 are: pump (3), filtration elements (1), tank (9), permeate tank (10), fittings and pipes, gauges and control instrumentation. The pump (3), the feed sides of the filtration elements (1) and the pipes and fitting between the pump (3) and the filtration elements (1) form a closed loop. The words "closed loop" or "loop" are used to refer to a recirculation loop in which at least some of the retentate produced from the filtration elements is returned directly (i.e. without passing through tank (9)) to the inlet of the pump 3.

The closed loop of FIG. 1 has an entry point connected to a tank (9) through pipe (11). Valve (8) is a simple open-close valve, which is open at any time when permeate or retentate or both may flow out of the loop. The loop also has an exit point for wasting concentrated feed water, optionally called retentate, brine or concentrate, from the loop. Wasted retentate flows through a flow meter (20) and is discharged or returned to the tank (9). The flow meter (20) is used to determine when the desired volume of retentate has been discharged from the loop, after which the discharge of retentate stops. Alternatively, the volume of retentate discharged from the loop may be controlled by a timer or other device. Optionally, the loop may also have another exit point (not shown) located at a high point in the loop for releasing air from the loop or priming the loop.

The system operates in a cross flow configuration and uses pressure as a driving force for flow and optionally for permeation. A pump (3), for example a centrifugal pump, generates pressure, which circulates retentate in the closed loop. In a preferred process used with FIG. 1, there is a period of batch or dead end filtration in which the retentate is concentrated. During this period, the retentate is continuously re-circulated in a closed loop back to the inlet of the pump and the volume of liquid in the closed loop is maintained generally constant. The flow of feed water into the closed loop to replace permeate leaving the loop is preferably self-regulating. The permeate flow rate is a controlled parameter.

The tank (9) may be a feed holding tank, or a bioreactor tank or other process tank. Feed water enters the tank (9) and, optionally, may be pre-treated in the tank (9). A bioreactor tank (9) may be, for example, an anoxic, aerated or aerobic suspended biomass tank, an anaerobic digester, an attached biomass tank, or any other tank containing a population of microorganisms used to digest one or more contaminants in wastewater.

The filtration elements (1) may comprise tubular membranes, for example of the type having a polymeric membrane layer cast inside of a tubular supporting structure comprising a fabric. Optionally, the filtration elements (1) may comprise plate and frame or other flat sheet based membranes. The membrane layer may optionally have pores in the microfiltration or ultrafiltration range.

Initially, water is fed into the loop from tank (9) by gravity or using a pump. After priming the system, the retentate is continuously recirculated inside the loop by the pump (3) maintaining a positive pressure through the feed side of the filtration elements (1). Clean permeate passes through the membranes under pressure on the feed side, and optionally under a partial vacuum on the permeate side. The trans-membrane pressure, or pressure differential between the feed or retentate side pressure (P1) and the permeate side pressure (P2), is the driving force for the filtration. The feed pressure for each filtration element (1) is different due to pressure loss in the piping and any upstream filtration elements (1), but the system may be operated without separately measuring the feed side pressure for each filtration element. Optionally, gas (i.e. air) bubbles may be introduced into the loop, or created in the loop by cavitation, to help scour the membranes. Although water is periodically discharged from the loop, a bubble may circulate through the loop multiple times before it is discharged.

The system in FIG. 1 operates under a process that includes measuring the permeate flow and maintaining it at a set value by continuously adjusting the permeate side pressure. Because the feed pressure (P1) varies slowly during a concentration step, the trans-membrane pressure and membrane flux can be controlled by varying the permeate pressure (P2) by modulating permeate valve (6) or a permeate pump optionally used in place of the permeate valve (6). The feed pressure varies slowly over time because the system operates at a fixed flow rate in the loop, and the temperature and viscosity of the retentate in the loop tend towards an equilibrium value. The flow rate in the loop may be feed water specific, for example based on the liquid velocity in the membranes needed to provide shear at the membrane surface to control fouling or reduce concentration polarization.

Pump (3) will continuously pump at a set flow rate resulting in a corresponding velocity in the loop and membranes. One way to achieve the selected flow rate for centrifugal pumps is to adjust the number of rotations per minute (RPM) of the pump. The flow and pressure are measured by the flow-meter (2) and the pressure gauge (or transducer) (P1). In an automated configuration as shown in FIG. 1, the flow-meter (2) sends signals to the variable frequency drive (VFD) (53), typically through an appropriate controller (not shown). The VFD (53) adjusts the pump RPM. Communication between the pressure transducer and the recirculation pump (3) can be direct or through an intermediate controller or PLC. Other methods to control the retentate velocity, such as a variable flow-restricting valve or by-pass loop, can also be employed.

By varying the pressure on the permeate side of the membranes, the trans-membrane pressure changes, thus modifying the permeate flux through the membrane. During operation, inside the filtration elements (1), the filtered liquid will permeate through the membranes. One or multiple filtration elements (1) connected in series or parallel or both (for example with two parallel filtration elements (1) feeding into one downstream filtration element (1)), can be incorporated in one loop. The filtered liquid is subsequently collected from the filtration elements (1) and directed to the permeate tank (10).

Water to be filtered is brought into the loop from the tank (9) to compensate for the volume of liquid permeated and any other liquid loses (like wasting or recirculation back to the tank (9)). Due to permeation of clean liquid, the concentration of solids, oil or any other contaminants in the loop increases. In order to maintain the concentration within a set value, continuously or preferably from time to time, a certain amount of concentrated retentate will be wasted.

The wasting of concentrated retentate can be done continuously at one or more controlled flow rates or, preferably, in fixed volumes at controlled intervals. A portion of the wasted liquid can also be recirculated (continuously or in small batches at controlled time intervals depending on how the system is set up to operate) back into the tank (9) through return pipe (13). Valves (4) and (15) control the distribution of wasted fluid from the loop between return to the tank (9) or wasting to discharge. The volume wasted will be replaced by fresh feed water brought from tank (9) into the loop through pipe (11). Valve (8) is continuously open during operation. The volume transferred into the loop self regulates and equals the cumulated volume of permeated and wasted liquid. Preferably, there is no wasting of sludge from tank (9).

The volume of wasted water is application specific, chosen to produce a desired recovery rate, and can be measured using a flow meter (20). Input from the flow meter (20) can be used to automate the system. Alternatively, the amount of retentate wasted is controlled by opening valves 4 or 14 for a predetermined amount of time. The volume of water to be filtered brought into the loop from the tank (9) is equivalent to the combined volume of filtered and wasted water withdrawn from the loop. The closed loop has a fixed hold up volume and is essentially air-tight. Preferably, the only point to compensate from any liquid loss from the loop is the feed water inlet to the loop. As stated above, for performance reasons, the permeate and wasted liquid are controlled losses. The elevation of the tank (9) as well as location of all the loop intake and discharge points are chosen such that water flows from the tank (9) into the loop automatically when required. Optionally, air may be added to the loop or bled from the loop to adjust the volume of water in the loop, or to provide an effective liquid hold up volume that is different than the actual hold up volume of the loop.

The filtered liquid (permeate) flow rate is monitored while operating the system. The permeate flow rate also impacts the long term membrane performance. A high permeate flow rate can accelerate the fouling of the membrane resulting in extended down time and increased demand for membrane cleaning chemical. A low permeate flow rate will make the system inefficient. An optional goal is to approach the largest amount of filtered water per unit of energy spent.

Figure 1A:
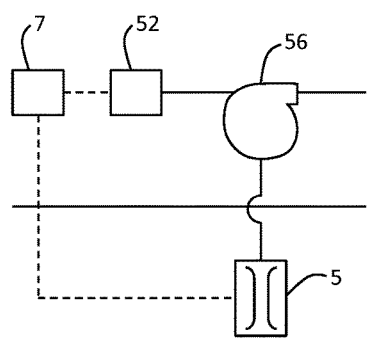
FIG. 1A is a drawing of an alternative part of the system of FIG. 1.

Permeate collected from the filtration elements (1) is measured with a flow meter (5). In a manual configuration this flow can be regulated by adjusting the permeate valve (6) or permeate pump to a set point that will convert into a certain value for the trans-membrane pressure (P1-P2) and subsequently the desired permeate flow. From time to time additional adjustments may be required to compensate for variations in the system, like fouling of the membrane. In an automated system as shown in FIG. 1, the flow meter (5) sends a signal to the control unit (7), which can be a PLC or just a simple controller. The control unit (7) sends a signal to the permeate valve (6), for example a motorized proportional valve, or permeate pump. The permeate valve (6) or permeate pump continuously adjusts the permeate flow and consequently the trans-membrane pressure. In either scenario, the permeate will be transported to the permeate tank (10) using permeate pipe (12). FIG. 1A shows an alternative system with a permeate pump (56) in place of valve (6) In this case, the control unit (7) sends signals to a variable frequency drive (VFD) (52) to adjust the speed of the permeate pump (56).

Figure 2:
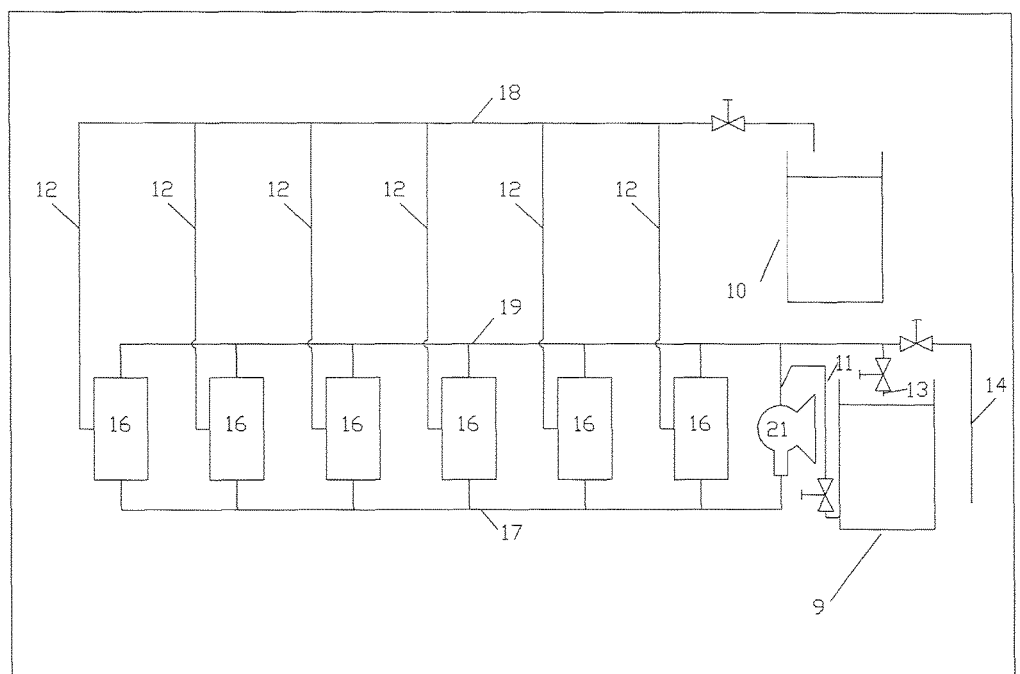
FIG. 2 is a schematic drawing of a system having multiple modules, or sets of modules, connected together in parallel.

FIG. 2 shows a more complex system with multiple batteries of membrane modules (16) connected together. One battery can be built using multiple filtration elements (1) connected in series. The single loop system shown in FIG. 1 can be considered a battery of modules. Permeate flow can be controlled either for each battery independently or for the entire system. Each battery is supplied with water from feed manifold (17) and will discharge into discharge manifold (19). Main pump (21) maintains continuous circulation of the retentate inside the loop. Similar to single loop system presented in FIG. 1, there is an exchange of concentrated retentate through pipes (13) and (14) as well as a continuous feed water replenishing through pipe (11) compensating for liquid loses from the loops. Permeate manifold (18) collects permeate from all the batteries and transports it to the permeate tank (10).

The systems described above may consume less energy than comparative systems with retentate returned to an ambient pressure process tank.

Closed loop filtration systems can be designed and built using any type of membranes: microfiltration, ultrafiltration, nanofiltartion or reverse osmosis. These membranes can be manufactured in tubular configuration of different shapes, hollow fiber or flat sheet. The system is most applicable to pressurized modules due to the higher amount of preserved energy but may be applicable to other types, like submerged or spiral wound. The design can be adapted accordingly while using one more aspects of the system and process described above.

A comparative cross flow filtration system may have a loop in which retentate recirculates through the membranes, but also has a continuous flow of retentate back to a tank that the feed water is supplied to the membranes from. Excess solids or liquid droplets are wasted from the tank. Without intending to be limited by theory, during the concentration step in the system described above, more energy already delivered into the system (for example kinetic energy or pressure of the retentate) is preserved relative to the comparative system. Less energy converted into heat during the concentration step is dissipated into the tank so there is less efficient heat transfer to the ambient atmosphere and more heat energy (temperature) preserved inside the loop. For example, retentate circulating in the loop may have a temperature of 10° C. or more above ambient temperature. For most liquids, a higher temperature will reduce the liquid viscosity resulting in higher membrane flux permeability and less pumping energy required to flow water through the loop. Wasting from the loop, and in particular during the deconcentration step, reduces the volume of waste produced by the process.

A filtration element that may be used in the system and process described above, or in other systems and processes, is shown in FIGS. 3 to 9.

Figure 3:
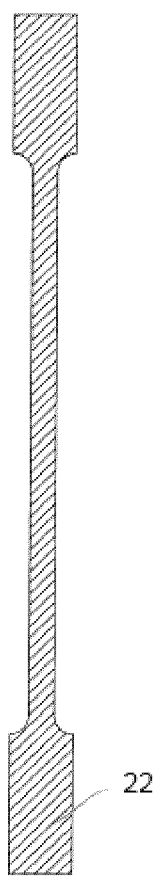
FIG. 3 is a cross section of a structural insert.
Figure 4:
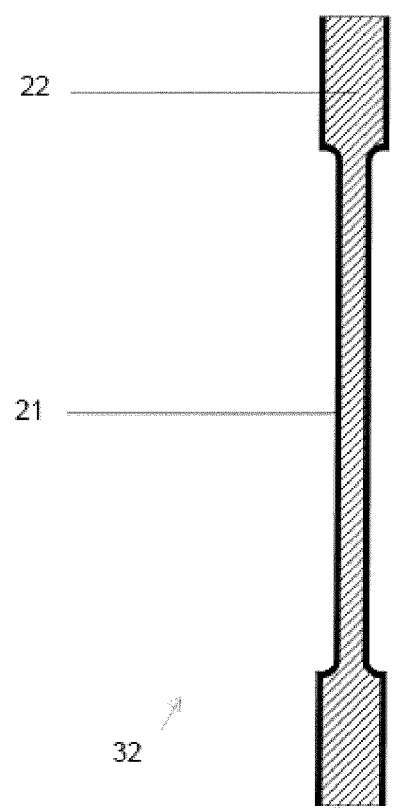
FIG. 4 is a cross section of a filtration sheet comprising the structural insert of FIG. 1 and one or more flat sheet membranes.

Referring to FIG. 3, an insert (22) is a rigid component manufactured from one or more materials such as plastic, metal, fiber reinforced plastic (FRP) or sintered plastic or metal. Referring to FIG. 4 a filtration sheet (32) has a structural insert (22) and a membrane (21). The insert (22) serves as a support for a flat sheet membrane (21). Optionally, the insert (22) may also serve as a carrier for the filtered liquid (permeate). In this case, the side faces of the insert (22) have a recessed or textured surface that can be obtained through machining or directly in an injection-molding tool. The surface can include channels in a single orientation, multiple orientation, random directions, a rough or textured surface or any other surface that will create a space between the membrane (21) and the insert (22) allowing the filtered liquid to flow towards an edge of the insert (22). The insert (22) can also be a porous material. Alternatively or additionally, a permeate spacer, for example of the type used in spiral wound membranes, may be placed between the membrane (21) and the insert (22). When a permeate spacer is used, the insert (22) may optionally have a smooth surface.

The membrane (21) is attached to the insert (22) for example by gluing or welding. The attachment is continuous around the circumference of the membrane except along at least one permeating edge. Optionally, the membrane (21) can be folded around one edge of the insert (22), sealed to the insert (22) along the two perpendicular edges of the insert (22) and left open along at least part of the remaining edge of the insert (22). Optionally, the membrane (21) can be held in place on the remaining edge of the insert (22) by mechanical means or by a discontinuous line of adhesive or welding until the next assembly operation. The backing surface of the membrane (21) between its edges may or might not be permanently attached to the insert (22).

The filtration element (21) can be either a flat sheet membrane casted separately and attached to the structural insert (22) or a membrane formed directly on the structural insert (22). If the insert (22) is made at least partially from a porous material, the membrane (21) can be coated directly on the insert (22) using any membrane forming method known in the art. Alternatively, a separate flat sheet membrane (21) can be made by any method or materials known in the art. For example, a flat sheet membrane (21) can be made by casting one or more reactive solutions onto a non-woven substrate. A flat sheet membrane typically has a thinner membrane wall than a tubular membrane and may have higher flux.

Figure 5:
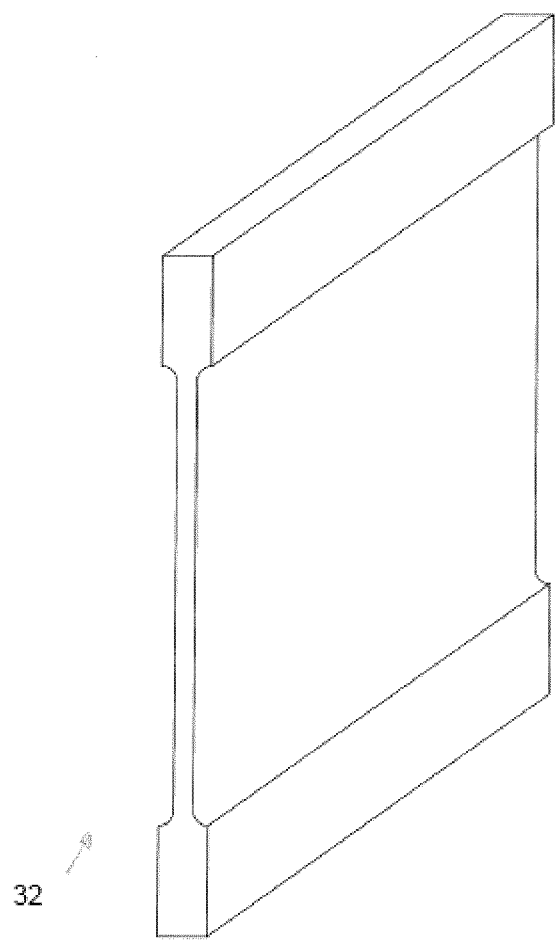
FIG. 5 is an isometric view of the filtration sheet of FIG. 4.

Referring to FIGS. 4 and 5, the insert (2) and filtration sheet (12) optionally has one or more raised edges. Alternatively, the insert (2) and filtration sheet (12) may be essentially planar.

Figure 6:
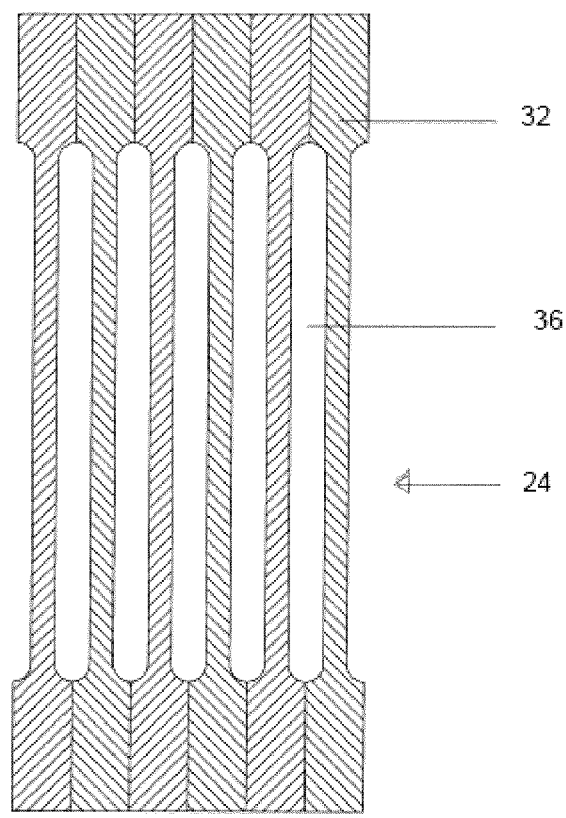
FIG. 6 is a cross section of a bundle having a plurality of the filtration sheets of FIG. 4.
Figure 7:
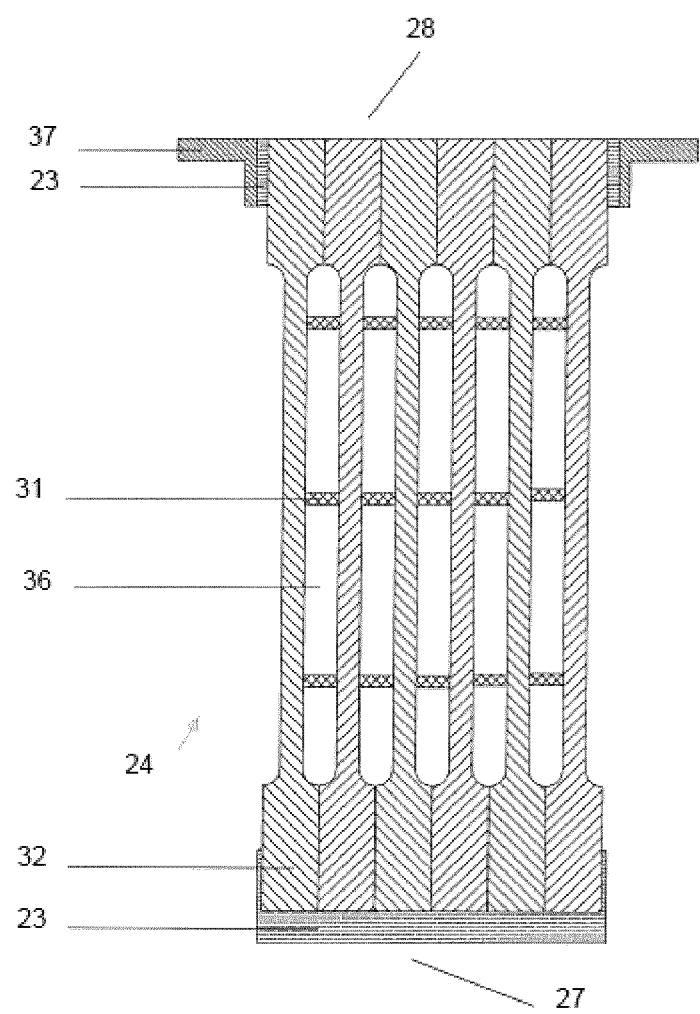
FIG. 7 is a cross section of a bundle as in FIG. 6 that has been potted.

Multiple filtration sheets (32) are assembled together as shown in the FIG. 6, forming a bundle (24). The filtration sheets (22) can be assembled together using mechanical fasteners, adhesives or by potting them together. Potting material (23), as shown in FIG. 7, can be either thermoset or thermoplastic. Potting is the preferred method of holding the filtration sheets (32) together. Optionally, one edge of the bundle (24) is potted to form a dead end (27) and the other end of the bundle (24) is potted to form a permeate end (28) as shown in FIG. 7. Alternatively, there may be two permeate ends (28) rather than one dead end (27) and one permeate end (28) as shown, the choice possibly depending on the intended use or application of the device. A dead end (27) does not need to be attached to a housing and so allows the filtration sheets (32) to freely expand or contract.

Leaks between adjacent filtration sheets (32) and contamination between the feed side and the permeate side of a membrane (21) is prevented by placing a gasket or an insulating material between the sides of the filtration sheets (32) coming in contact with each other or by allowing the potting material (23) to flow in between the filtration sheets (32) and fill in any gaps. If the filtration sheets (32) are essentially planar, then gaskets or potting material (23) or both between the edges of adjacent filtration sheets (32) also space adjacent filtration sheets (32) apart.

By placing the filtration sheets (32) side by side but with spacing between their central areas, a number of feed channels (36) are formed inside the bundle (24). The channels (36) shown in FIG. 6 and FIG. 7 have a generally rectangular shape but with rounded ends formed by the shape of the filtration sheets (32) of the potting material (23) between the filtration sheets (23). Alternatively, the channels (36) may also be oval, arcuate, elliptical, round, rectangular or square. Various channel shapes can be achieved by altering the design of the inserts (22).

During or after the assembly of the bundle (24), optional spacers (31) can be placed in between the filtration sheets (32) as shown in FIG. 5. Spacers (31) placed inside the feed channels (36) may be used to help hold the membrane (21) against the structural insert (22) or to prevent adjacent filtration sheets (32) from flexing into contact with each other. Using spacers (31) or attaching the membranes (21) to the inserts (22) allows backwashing the membrane (21). A pillowing effect of the membrane (21) in between the spacers (31) may be observed, but the pressure levels required for backwashing can be low enough to not jeopardize the membrane integrity. The spacers (31) are optional and can also be omitted, particularly in applications not requiring backwashing or if an alternative means (such as an adhesive or sonic welding) is used to attach the membranes (21) to the inserts (22). For example, the membranes (21) can be attached to the inserts (22) along only high points in the surface of the inserts (22) or by discontinuous welding or adhesive.

Figure 8:
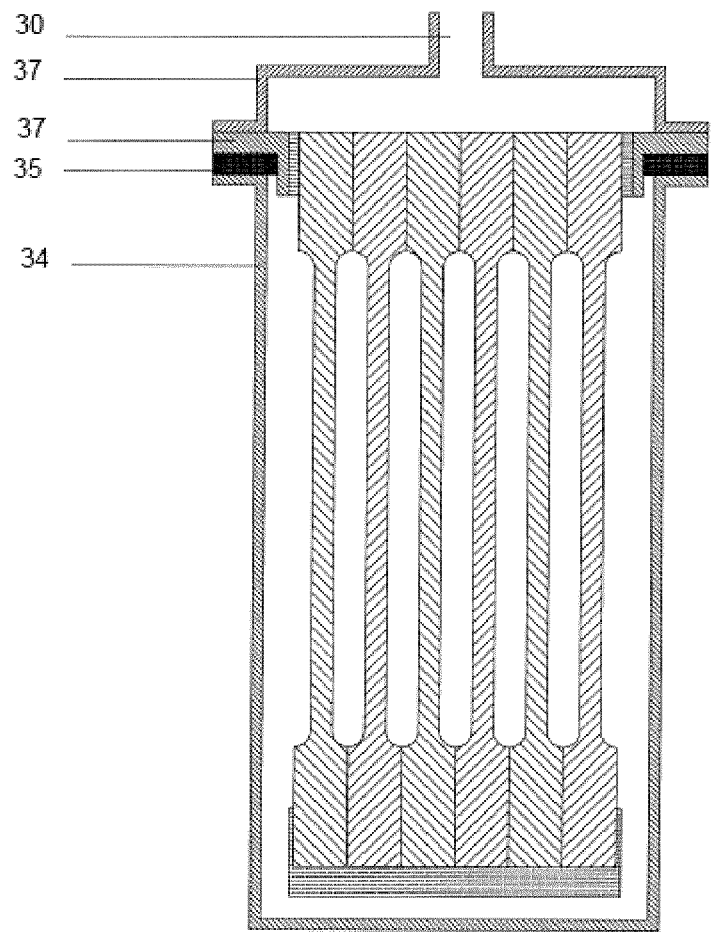
FIG. 8 is a cross section of a module having a potted bundle as in FIG. 7.

As shown in FIG. 8, to make a module or element a potted bundle (33) is inserted into the housing (34). The housing (34) can have different shapes such as round, oval, rectangular or square. The shape may be established, for example, based on operating pressure or space constraints. The bundle (23) is attached to the housing (34). A permeate end (38) is the attaching point. The permeate header (37), comprising in the example shown a plate the bundle (24) was potted in glued to a cap, is sealed to prevent leaks and contamination using a gasket (35) sandwiched between the permeate header (37) and the housing (34). When the bundle (33) has just one permeate end (28), the closed end (27) is contained inside the housing (34) in a free-floating condition. This feature is particularly preferred for high temperature applications, eliminating additional stresses from thermal expansion.

Figure 9:
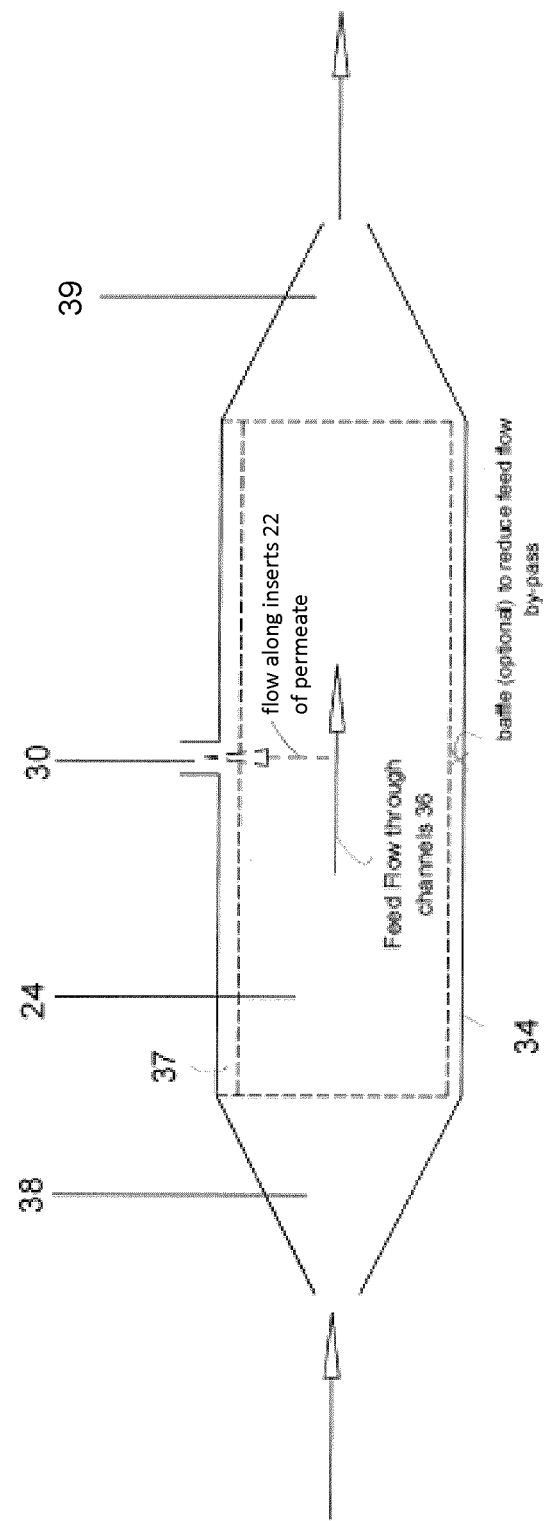
FIG. 9 is a schematic view of the module of FIG. 8 in an elevation view and showing fluid flow through the module.

Referring to FIG. 9, liquid to be filtered is typically fed by means of pressure, for example using a pump or simply a head pressure. Liquid flows from the feeding end (38) through the feed channels (36) to the discharge end (39). Baffles may be added in the housing (34) as required to induce flow through the feed channels (36). The pressure differential between the feed side and the permeate side will force the liquid through the membranes (21) of the bundle (24). Permeate (filtered liquid) will then flow through passages, such as openings, channels or pores, of the inserts (22) or feed channel spacers towards a permeate end (28) where it will be collected at the permeate port (30). In order to prevent premature degradation of the module performance the pressure difference may be monitored continuously.

The device may be used in a cross flow or dead end configuration. Cross flow is the preferred method. This inhibits suspended solids from concentrating on the membrane surfaces as concentration polarization (even without feed spacers) and provides better control of the retentate concentration.

Figure 10:
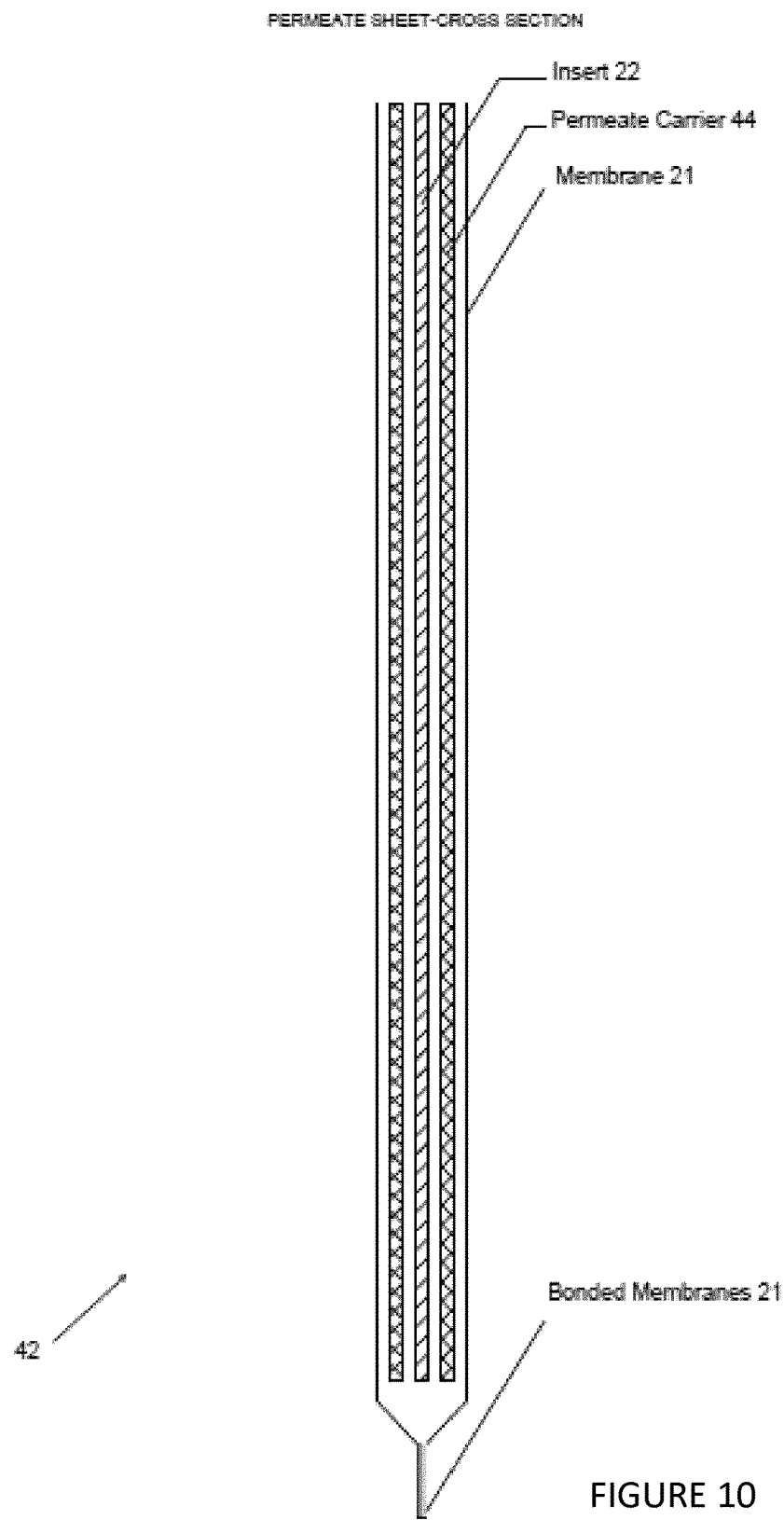
FIG. 10 is a cross section of a permeate sheet, which is an alternative to the filtration sheet of FIG. 4.

FIG. 10 shows a permeate sheet 42. Permeate sheet 42 is an alternative to filtration sheet 32 and may be used in a bundle 24 as described above, or in an alternative bundle shown in FIG. 12. Permeate sheet 42 has an insert 22 and membrane 21 as described above. In the example illustrated, insert 22 has smooth surfaces covered with sheets of permeate carrier 44. For example, the insert 22 may be cut from a flat plastic sheet. The insert 22 may be 1 mm or more in thickness. The insert 22 is stiff or rigid relative to the membranes 21 and the permeate carriers 44. Alternatively, an insert 22 with recessed surfaces may be used, and the permeate carriers 44 may be omitted. The membranes 21 are bonded together around a portion of the periphery of the insert 22. The bonding may be achieved, for example, by an adhesive or by welding.

Figure 11:
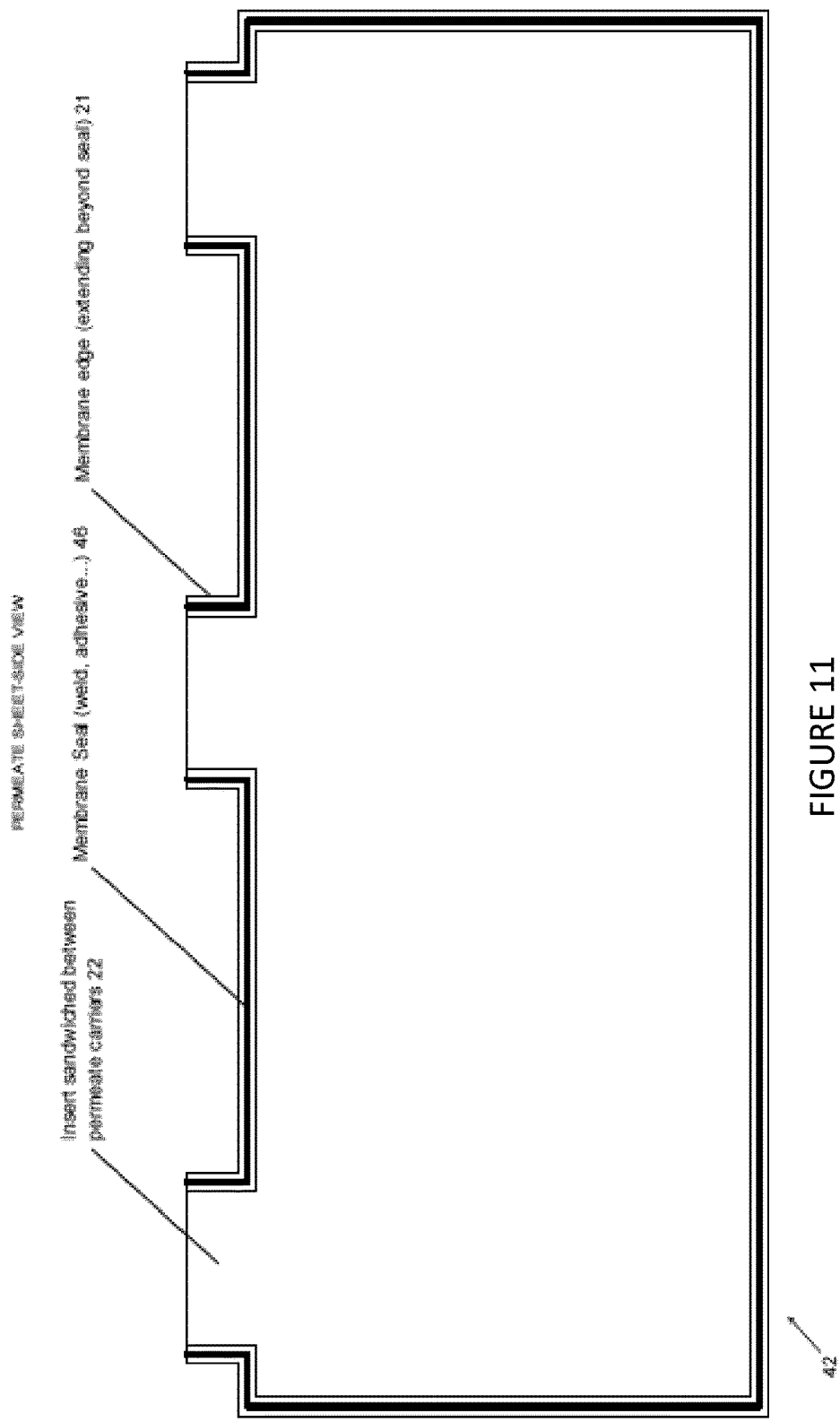
FIG. 11 is a cut open elevation view of the permeate sheet of FIG. 10.

FIG. 11 shows a side view of the permeate sheet 42 of FIG. 10 but with the membrane (21) and permeate carrier 44 closest to the viewer removed. The insert (22) is generally rectangular, but with one or more protrusions extending from one edge. The permeate carriers (44) have essentially the same size and shape as the insert (22). For example, the edges of the permeate carriers (44) may be slightly (i.e. up to 5 mm) inside of or outside of one or more edges of the insert (22). The membranes (21) are bonded together beyond the edges of the insert (22) and permeate carriers (44), if any, to form an envelope around the insert (22). However, the membranes (21) are left un-bonded for at least a portion of one edge, for example along the top of the protrusions as shown in FIG. 11. Accordingly, permeate collected inside the envelope may exit through the protrusions. Optionally, if permeate carriers (44) with parallel flow channels are used, multiple pieces of permeate carrier (44) may be assembled one or both sides of the insert (22) to provide a flow field directing permeate to the protrusions.

Figure 12:
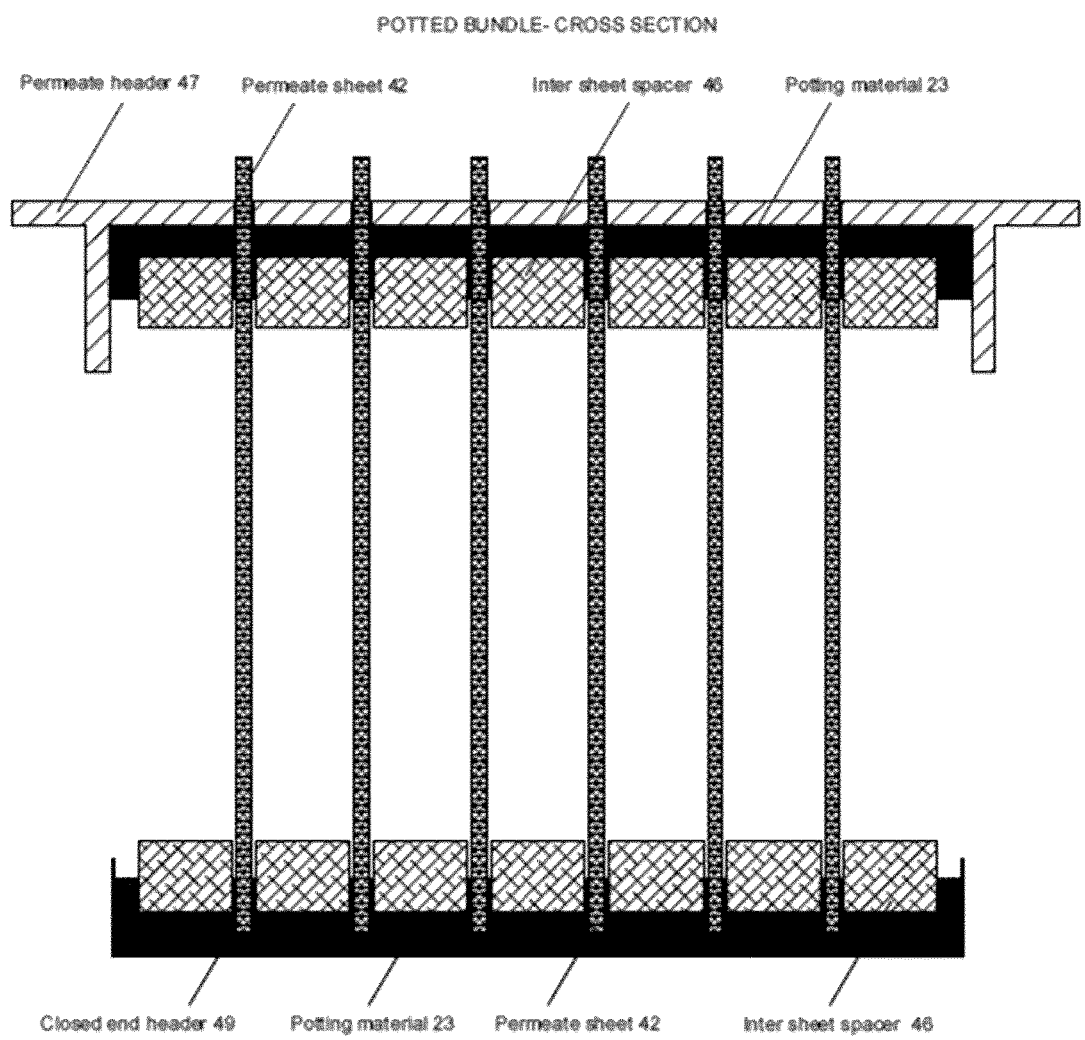
FIG. 12 is a cross section of a plurality of the permeate sheets of FIGS. 10 and 11 potted into an alternative bundle.

FIG. 12 shows a set of permeate sheets (42) potted into a permeate header (47) and a closed end header (49). The headers (47), (49) are generally pan shaped parts and may be made of, for example, metal or plastic. Alternatively, the permeate sheets (42) could have protrusions on two or more edges and could be potted into two or more permeate headers (47). In another alternative, the permeate sheets (42) could be potted into a permeate header (47) at one edge and not potted on any other edge. In the example illustrated, the bundle shown in FIG. 12 will be mounted into a module as described above. In particular, permeate header (47) will be sealed to a housing and provided with a cap for collecting permeate, and the closed end header (49) will be free floating inside the housing. In this way, expansion of the housing or bundle due to changes in pressure and temperature will not create physical stress on the potting material (23). However, attaching the permeate sheets (42) together in the closed end header (49) allows thinner inserts (22) to be used relative to a bundle with only a permeate header (47) while providing similarly stable channels between adjacent permeate sheets (42). The closed end header (49) also facilitates using baffles near the inlet of a housing to force water to flow between the permeate sheets (42).

Still referring to FIG. 12, inter sheet spacers (46) are provided between the potted edges of the permeate sheets (42). The inter sheet spacers (46) help provide channels of consistent width between each pair of permeate sheets (42). The inter sheet spacers (46) help prevent the membrane (21) from pulling away from the insert (22) if the potting material (23) shrinks while curing. The inter sheet spacers (46) can also reduce the amount of potting material (23) required in a header(47), (49).

The permeate header (47) has slots to receive the protrusions of the permeate sheets (42). The sealed edges of the membranes (21) between the protrusions, and on the edges of the permeate sheets (42) potted in the closed end header (49) are preferably located within a layer of potting material (23) located between the inter sheet spacers (46) and the header (47), (49). The protrusions reduce the amount of potting material 23 required to pot the permeate sheets 42 since the permeate header (47) helps support the potting material (23) to withstand the pressure differential between the inside and the outside of the housing. Between the protrusions, the permeate header (47) is continuous from side to side. This allows the permeate header (47) to also help reinforce the housing.

Figure 13:
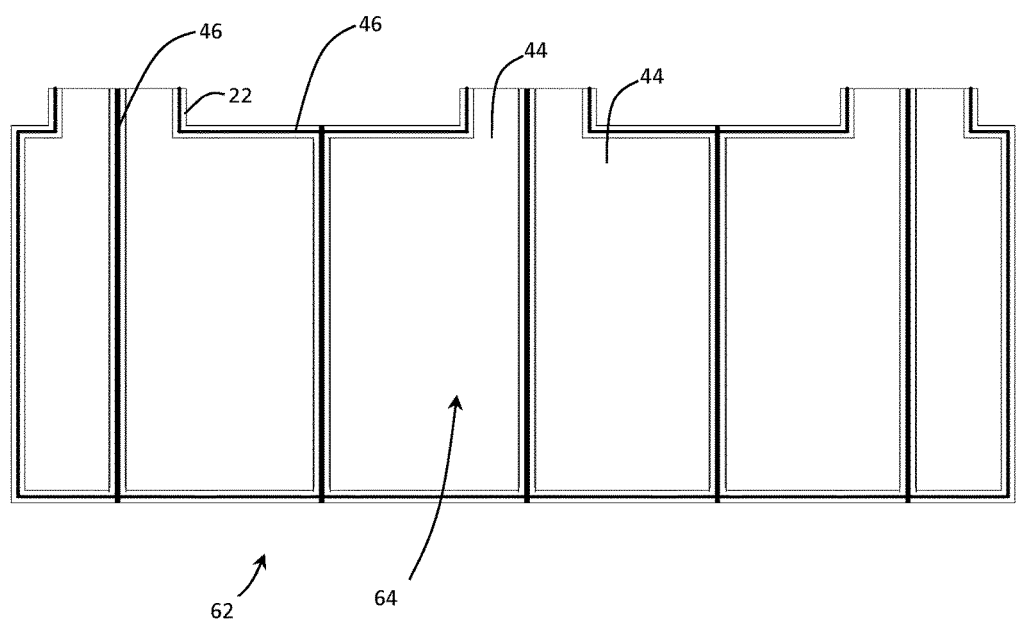
FIG. 13 is a cut open elevation view of an alternative permeate sheet.

FIG. 13 shows an alternative permeate sheet (62). The alternative permeate sheet (62) can be potted in the same way as the permeate sheet (42). In FIG. 13, only the membrane (21) closest to the viewer has been removed. The edges of the permeate carrier (44), other than optionally at the top of the protrusions, are displaced inwards from the edge of the insert (22). The membrane (21), not visible in FIG. 13, is attached and sealed to the insert (22) rather than to the membrane (21) on the other side of the insert (22). The membrane seals (46), which may be produced by an adhesive or welding for example, are located at the edges of the insert (22) or displaced inwards from the edges of the insert (22), preferably not beyond the edges of the permeate carrier (44). Optionally, additional membrane seals (46) may be added across the insert (22). The membrane seals (46) may be configured to create pockets (64) as shown in FIG. 13 or not. Preferably, the permeate carrier 44 is cut into pieces sized and shaped to fit in the pockets (64). The additional membrane seals (46) allow the membrane (21) to be backwashed without excessive ballooning. The pockets (64) prevent the flow of backwash water across the entire insert (22). This improves backwashing efficiency by inhibiting backwash water from flowing out through the least fouled parts of a membrane (21). Additional membrane seals (46) or pockets (64) may optionally be added to the permeate sheet (42) or filtration sheet (32).

We claim:

1. A filtration system comprising,
a pump having an inlet and an outlet;
a pipe network including a loop extending from the outlet of the pump back to the inlet of the pump;
a filtration element having a feed side of the filtration element located in the loop;
an inlet to the loop located between the filtration element and the inlet of the pump;
an outlet from the loop located between the outlet of the pump and the inlet to the loop;
a valve or a permeate pump in communication with a permeate side of the filtration element;
a flow sensor in communication with the permeate side of the filtration element; and,
a controller connected to the valve or the permeate pump and to the flow sensor,
wherein the controller is configured to modulate the valve or the permeate pump so as to maintain a predetermined flow rate or flow rate range as measured by the flow sensor.

2. A filtration system comprising,
a first pump having an inlet and an outlet;
a pipe network including a loop extending from the outlet of the first pump back to the inlet of the first pump;
a filtration element having a feed side of the filtration element located in the loop;
an inlet to the loop located between the filtration element and the inlet of the first pump;
an outlet from the loop located between the outlet of the first pump and the inlet to the loop; and
a permeate pump in communication with a permeate side of the filtration element.

3. The filtration system of claim 1 further comprising a second flow meter between the outlet of the pump and the filtration element and a second controller connected to the second flow meter and to the pump, wherein the second controller is configured to modulate the pump so as to maintain a predetermined flow rate or flow rate range as measured by the second flow meter.

4. The filtration system of claim 1 wherein the filtration element comprises tubular membranes or flat sheet membranes.

5. The filtration system of claim 1 wherein the filtration element comprises flat sheet membranes supported on their permeate sides.

6. A process of filtering water comprising the steps of,
   a) in a first step (i) recirculating water through a loop comprising a pump and a filtration element, (ii) removing water from the loop through the filtration element and (iii) adding water to the loop;
   b) in a second step, (iv) discharging water from the loop other than through the filtration element and (v) adding water to the loop,
   wherein the first and second steps are repeated in a cycle.

7. The process of claim 6 wherein the concentration of solids in water in the loop increases during the first step and decreases during the second step.

8. The process of claim 6 further comprising a step of circulating water in the loop without withdrawing permeate from the loop.

9. The process of claim 8 wherein the step of circulating water in the loop without withdrawing permeate from the loop occurs directly before, during or directly after the second step, or at a combination of these times.

10. The process of claim 6 wherein the volume of water discharged in the second step is less than or similar to the hold up volume of the loop.

11. The process of claim 6 wherein the filtration element comprises a membrane and the second step is commenced considering a parameter related to a transmembrane pressure of the membrane or the solids concentration of the water in the loop or both.

12. The process of claim 6 wherein the pump is operated so as to provide a generally constant flow velocity in the loop, or a velocity that increases during the first step.

13. The process of claim 6 wherein the filtration element comprises a membrane and the flux through the membrane is maintained essentially constant in the first step.

14. The process of claim 6 wherein the inlet side of the pump is in open communication with a feed tank during at least part of the first or second step or both.

15. The process of claim 6 wherein removing water from the loop through the filtration element comprises applying suction to a permeate side of the filtration element.

16. A process for treating water comprising the steps of,
   a) recirculating water through a loop comprising a recirculation pump and a filtration element;
   b) removing water from the loop through the filtration element;
   c) adding water to the loop from a biological process tank; and,
   d) removing waste sludge from the loop
   wherein the biological process tank is maintained under anaerobic conditions and
   wherein step b) comprises applying suction to a permeate side of the filtration element.

17. The process of claim 16 wherein water flows from the biological process tank to the loop by gravity or by suction created by the recirculation pump or both.

18. The process of claim 16 wherein the waste sludge is removed from the loop in batches.

19. The process of claim 16 wherein waste sludge is removed from the loop by gravity, by pressure provided in the recirculation pump, or both.

\* \* \* \* \*